United States Patent [19]

Tom

[11] Patent Number: 4,738,693
[45] Date of Patent: Apr. 19, 1988

[54] VALVE BLOCK AND CONTAINER FOR SEMICONDUCTOR SOURCE REAGENT DISPENSING AND/OR PURIFICATION

[75] Inventor: Glenn M. Tom, New Milford, Conn.

[73] Assignee: Advanced Technology Materials, Inc., New Milford, Conn.

[21] Appl. No.: 117,207

[22] Filed: Nov. 4, 1987

Related U.S. Application Data

[63] Continuation-in-part of Ser. No. 43,168, Apr. 27, 1987.

[51] Int. Cl.$^4$ .............................................. B01D 53/04
[52] U.S. Cl. .......................................... 55/36; 55/52; 55/74; 55/165; 55/387
[58] Field of Search ................... 55/36, 52, 74, 65, 387

[56] References Cited

U.S. PATENT DOCUMENTS 4,197,097 4/1980 Magorien ............................. 55/165

Primary Examiner—Charles Hart
Attorney, Agent, or Firm—Steven J. Hultquist

[57] ABSTRACT

A valve block leak-tightly joinable to a receptacle to form a container suitable for liquid storage/vapor dispensing, and gas purification applications. The valve block is provided with first and second valve ports with which valves may be employed to flow feed gas through the valve block and receptacle. To effect purging the valve block ports and gas flow passages, the valve block is provided with a purge valve port which may be opened while the first and second valve ports are closed, to remove dead space hold-up gas from the respective ports and flow passages of the block prior to initiation of vapor dispensing or gas purification operation. The disclosed container is particularly advantageous for dispensing or purifying source reagent compounds for elements of Group III and Group V, in semiconductor manufacturing applications.

21 Claims, 7 Drawing Sheets

VALVE BLOCK AND CONTAINER FOR SEMICONDUCTOR SOURCE REAGENT DISPENSING AND/OR PURIFICATION

CROSS-REFERENCE TO RELATED APPLICATION

This is a continuation-in-part of U.S. application Ser. No. 07/043,168 filed Apr. 27, 1987 in the name of Glenn M. Tom.

BACKGROUND OF THE INVENTION

1. Field of the Invention

This invention relates generally to a valve block, which is joinable to a receptacle to form a container. Containers of such type are suitable for storing liquid, and dispensing a vapor phase from the liquid in a carrier gas passed in contact therewith, and are also useful for containing a sorbent medium to effect purification of an impurity-containing gas flowed through the container.

2. Description of the Related Art

In many industrial applications, it is desirable to transfer a vapor component in a carrier gas medium, the carrier gas generally being inert in the application for which the vapor is present as an active constituent.

An example of such application is in the manufacture of semiconductor devices, in which the vapor constituent may be a dopant, etchant, or conductive material, which is deposited on the semiconductor substrate.

In such semiconductor manufacture applications, numerous vapor constituents are highly toxic in character, particularly those which are source reagents for metallic components such as beryllium, cadmium, selenium, tellurium, and the like.

Accordingly, it has been common practice in the art to employ liquid storage devices for the precursor liquids from which the vapor constituent is derived. In operation, the vapor phase is dispensed by passage of a carrier gas in contact with the liquid in the storage/dispensing device, so that vapor is picked up by the carrier gas and flowed therein to the point of use in the manufacturing system.

Due to the high purities required for the vapor constituent in such applications, it is critical that the carrier gas and vapor constituent be of high purity. Further, there must be no significant contaminants introduced into the carrier gas of the vapor constituent in the contacting step, when the carrier gas is passed in contact with the liquid from which the vapor constituent is derived.

Similarly, due to the purity requirements for semiconductor source reagent gases, it is frequently necessary to purify such reagent gases of contaminants by contacting the gases with sorbent materials selective for the undesired contaminants. The contacting vessels containing the sorbent materials are therefore leak-tightly constructed to avoid atmospheric or environmental contamination of the process gases, as well as to prevent the loss of process gases from the vessel, especially when the same are toxic in character.

One significant problem in the operation of previously-developed liquid storage/vapor dispensing containers and sorbent containers is the fact that they typically have "dead spaces" which are difficult to purge. As a result, hold-up gas trapped in such dead spaces is introduced into the processing system, with consequent adverse effect on the downstream operation to which the process gases are transmitted.

More specifically, the conventional liquid storage/vapor dispensing device is constructed as an assembly of a cup in which the liquid is retained, and a valve block overlying and enclosing the cup. The valve block features an inlet for introducing carrier gas into the cup, and an outlet for discharging carrier gas containing vapor derived from the liquid in the cup. Thus, the inlet and outlet communicate with interior passages in the valve block, which in turn communicate with the interior volume of the cup.

In use, a carrier gas source, e.g., a gas cylinder, is coupled by means of suitable valving and connectors to the inlet. The outlet is similarly coupled by suitable valve and connecting means to flow circuitry for conveying the vapor-containing gas to ultimate end use apparatus.

In such devices, when the respective valves associated with the inlet and outlet are opened, and gas is admitted to the system, the hold-up volume of dead space gas in the valve block is displaced into the outlet conduit and carried to the end use apparatus.

Since the dead space gas is typically air or atmospheric gases, significant contamination of the gas occurs, which may necessitate wasting of the hold-up gas. As indicated, the liquid may yield highly toxic vapor constituents. This in turn may raise a significant disposal problem for the hold-up gas, if it contains any concentration of the vapor constituent.

Alternatively, if the hold-up gas is not wasted, there may be significant contamination of the vapor component by the hold-up gas, which will adversely affect the end use application. For example, in the manufacture of semiconductors, any minute impurity components in the dopant, source reagent, etc., may render the semiconductor device defective or even useless for its intended purpose.

Thus, a major problem associated with the purging of the liquid storage/vapor dispensing device, by passage of inert or carrier gas through the device, is that such gas tends to contact and contain significant quantities of the vapor component derived from the liquid in the device. Where such vapor is highly toxic, as is the case in many semiconductor manufacture applications, it is apparent that the resulting gas mixture produces either an undesirable disposal problem upon purging, due to the toxic constituents of the gas, or else introduces significant impurities to the final product manufactured from the vapor constituent.

Apart from the aforementioned considerations associated with dead spaces in the valve block, the liquid storage/vapor dispensing device is desirably constructed with a minimum of joints, and external welds. Such joints and welds are sources of potential leakage and failure in the device. Furthermore, such joints and welds are not easily inspected while the device is in operation, to determine whether complete structural integrity (leak-tightness) has been maintained.

Similar problems and considerations are applicable to sorbent containers in which a sorbent medium is contained in a receptacle joined to a valve block regulating gas flows through the sorbent bed.

Accordingly, it would be a significant advance in the art to provide a valve block, suitable for application to liquid storage/vapor dispensing containers, or to sorbent containers, which is readily purged of the hold-up gas retained in the "dead spaces" of the inlet, outlet, and associated passages of the valve block.

It therefore is an object of the present invention to provide a valve block for such containers, which is readily purged of "dead space" gas.

It is another object of the invention to provide a container comprising a valve block of such type, which is readily fabricated and simple in construction.

It is a further object of the invention to provide a valve block-equipped container of the aforementioned type, having a minimum number of joints and seals, such as may be latently susceptible in operation to leakage of fluid into or out of the container.

Other objects and advantages of the invention will be more fully apparent from the ensuing disclosure and appended claims.

SUMMARY OF THE INVENTION

In one aspect, the present invention relates to a valve block, comprising:
(a) a block leak-tightly joinable at its bottom face to a receptacle and having top, bottom, front, rear and side faces;
(b) an inlet in the top face of the block for introducing fluid thereto;
(c) an outlet in the top face of the block for discharging fluid therefrom, in spaced relationship to said inlet;
(d) a first valve port in a first side face of the block;
(e) a second valve port in a second side face of the block;
(f) a third valve port in the front face of the block;
(g) a first fluid flow passage joining the inlet and the first valve port;
(h) a second fluid flow passage joining the first valve port and the bottom face of the block;
(i) a third fluid flow passage joining the first valve port and the third valve port;
(j) a fourth fluid flow passage joining the third valve port and the second valve port;
(k) a fifth fluid flow passage joining the second valve port and the bottom face of the block, and in spaced relationship to the second fluid flow passage;
(l) a sixth fluid flow passage joining the second valve port and the outlet;
the respective fluid flow passage at their junctures with the respective valve ports being positioned relative to one another whereby independently operable valve disposed in the valve ports and operable to provide selected open or closed valve positions establish sequential fluid flow communication (A) when the third valve port valve is closed and the first and second valve port valves are open, from the inlet through only the first fluid flow passage first valve port, second fluid flow passage, receptacle, fifth fluid flow passage, second valve port, and sixth gas flow passage, to the outlet, and (B) when the third valve port valve is open and the first and second valve port valves are closed, from the inlet through only the first fluid flow passage, first valve port, third fluid flow passage, third valve port, fourth fluid flow passage, second valve port, and sixth fluid flow passage, to the outlet.

In another aspect, the invention relates to a container comprising a receptacle leak-tightly joined at the block bottom face to a valve block as above described. In further specific aspects, the receptacle may contain a liquid whose vapor is dispensed into a carrier gas flowed through the container, or the receptacle may contain a sorbent medium to purify an impurity-containing gas flowed through the container.

In one broad method aspect, the present invention relates to a method of dispensing a vapor phase from a contained liquid, comprising:
(a) providing a container as broadly described in the preceding paragraph, containing liquid in its receptacle, and with valves at each of the aforementioned first, second, and third valve ports thereof, wherein all valves are in a closed position;
(b) coupling the inlet of the container to a carrier gas supply means;
(c) opening the third valve port valve while keeping the first and second valve port valves closed, to flow carrier gas from the supply means through the inlet, first fluid flow passage, first valve port, third fluid flow passage, third valve port, fourth fluid flow passage, second valve port, sixth fluid flow passage, and to the outlet, for discharge from the container, thereby purging hold-up gas from such flow path; and
(d) closing the third valve port valve, and opening the first and second valve port valves, to flow carrier gas from the supply means through the inlet, first flow flow passage, first valve port, second fluid flow passage, receptacle, fifth flow flow passage, second valve port, sixth fluid flow passage, and to the outlet, for discharge of vapor-containing carrier gas from the container.

In another method aspect, the present invention relates to a method of purifying a gas of impurities, comprising:
(a) providing a container as broadly described hereinafter, containing in its receptacle a sorbent selective for the aforementioned impurities, and with valves at each of the aforementioned first, second, and third valve ports thereof, wherein all valves are in a closed position;
(b) coupling the inlet of the container to a purge gas supply means;
(c) opening the third valve port valve while keeping the first and second valve port valves closed, to flow gas from the purge gas supply means through the inlet, first fluid flow passage, first valve port, third fluid flow passage, third valve port, fourth fluid flow passage, second valve port, sixth fluid flow passage, and to the outlet, for discharge from the container, thereby purging hold-up gas from such flow path; and
(d) closing the third valve port valve;
(e) uncoupling the inlet of said container from the purge gas supply means;
(f) coupling the inlet of the container to a source of the impurity-containing gas; and
(g) opening the first and second valve port valves, to flow impurity-containing gas from the supply means through the inlet, first fluid flow passage, first valve port, second fluid flow passage, receptacle, fifth fluid flow passage, second valve port, sixth fluid flow passage, and to the outlet, for discharge of impurity-depleted gas from the container.

Other features and elements of the invention will be more fully appreciated from the ensuing disclosure and appended claims hereof.

DETAILED DESCRIPTION OF THE INVENTION, AND PREFERRED EMBODIMENTS THEREOF

Figure 1:
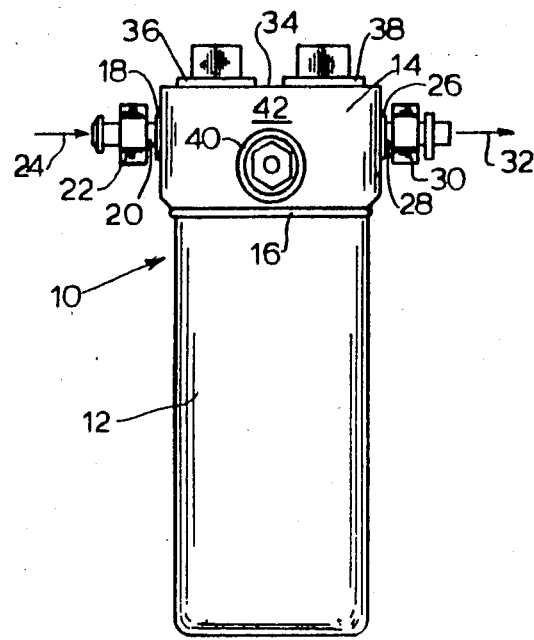
FIG. 1 is an elevation view of a liquid storage/vapor dispensing container, utilizing a valve block according to one embodiment of the invention.

The valve block of the present invention may be usefully joined, in a leak-tight manner, to receptacles of various specific types, to form containers which are advantageously employed to hold liquids for vapor dispensing, or to contain sorbents for fluid purification.

In the case of vapor dispensing, a carrier gas is flowed via the valve block into the container receptacle for contacting with the liquid therein. By such contacting, the vapor phase of the liquid is introduced into the carrier gas, which then flows from the receptacle and through the valve block to the container outlet.

In gas purification applications, a sorbent material is disposed in the containter receptacle, and the impurity-containing fluid is flowed via the valve block into the receptacle for contacting with the sorbent to remove impurity therefrom. The resulting impurity-depleted fluid flows through the valve block to the container outlet.

The liquid storage/vapor dispensing container embodiment of the invention is adapted for the storage, transport and delivery of materials such as ultra-high purity reagents.

Such storage/dispending containers, wherein a vapor phase of a liquid is dispensed in a carrier gas which has been passed in contact with the liquid, find utility in application areas such as electronics, aerospace, and defense.

The liquids with which the vapor dispensing container of the present invention may be employed include any suitable liquids capable of yielding a vapor phase to a carrier gas with which the liquid is contacted. Examples of such liquids include those which are source compounds for elements selected from the group consisting of Group III and Group V elements, such as polyalkyl compounds of such type. Illustrative of such suitable polyalkyl compounds are trimethyl aluminum, trimethyl gallium, dimethyl beryllium, dimethyl selenium, dimethyl tellurium, and dimethyl cadmium.

It will be appreciated that the foregoing listing of polyalkyl compounds is illustrative in character only, and that various other polyalkyl compounds, as well as numerous other liquid materials of various types, may be disposed in the storage portion of the device, to provide the corresponding vapor component when a suitable carrier gas is passed in contact with the liquid.

It will also be appreciated that the utility of the vapor dispensing embodiment of the invention is not strictly limited to liquids, but may be used in connection with the storage of solid materials having sufficient vapor pressure to produce a vapor phase constituent of a carrier gas, when the later is passed in contact with the solid. Accordingly, the term "liquid" as used in this contact is intended to be broadly construed to include not only liquids but, where applicable, solids meeting the foregoing criterion as well.

It will further be appreciated that instead of directly contacting the carrier gas with the liquid, to provide vapor from the liquid in the effluent carrier gas, it may in some instances suffice to simply contact the carrier gas with a pre-existing vapor phase of the liquid, e.g., the vapor overlying a liquid volume in the storage/dispensing device. Accordingly, the phase "passed in contact with the liquid" will be understood as broadly including the contacting of the carrier gas with the liquid itself, the contacting of the carrier gas with the vapor phase of such liquid, or both the liquid and vapor phases of the liquid.

In the drawings referred to hereinafter, FIGS. 1-9 describe containers for fluid dispensing and/or purification as disclosed and claimed in my prior copening U.S. application Ser. No. 07/043,168 filed Apr. 27, 1987, wherein the inlet and outlet elements of the container are in respective side faces of the block and first and second valve ports are located in spaced relationship to one another on the top face of the block. FIGS. 10-17 herein are directed to alternative embodiments of containers for fluid dispensing and/or purification, wherein the respective inlet and outlet elements are located in the top face of the block, in spaced relationship to one another, with the first and second valve ports at opposite side faces of the valve block.

Referring now to the drawings, FIG. 1 shows an elevation view of a liquid storage/vapor dispensing container according to one embodiment of the invention. The container 10 comprises a receptacle 12 for containing liquid, the vapor phase of which is to be dispensed. The receptacle thus may have a cup-like configuration with an open upper end. Preferably the receptacle is integrally formed as a single piece article, to eliminate the presence of joints, seams, and seals, except at its uppermost end, where it is leak-tightly joined to the valve block 14, e.g., by the circumferentially extending weld 16, or by other joining or bonding means whereby satisfactory leak-tightness is assured for the container comprising the receptacle and valve block elements as joined to each other.

The receptacle and valve block elements may be formed of any suitable material providing requisite leak-tightness, i.e., near-zero permeability, and the appropriate weight, forming, appearance, and joining characteristics for the intended use application. In the broad practice of the invention, valve block and receptacle elements of stainless steel, e.g., 304 stainless steel, have been used to good advantage.

The valve block 14 of receptacle 10 features an inlet 18, to which has been joined a connector conduit 20 and coupling 22, for joining the inlet in gas flow communication with a suitable source of a carrier gas such as nitrogen, helium, krypton, argon, hydrogen etc., as supplied from the schematically illustrated carrier gas feed line 24, which is joined to a suitable source of carrier gas such as a pressurized tank or other supply means (not shown).

From such feed line, coupling conduit, and inlet, the carrier gas is flowed through passages in the valve block 14, as hereinafter more fully described, and passed into the receptacle 12 for contacting with the liquid therein. The vapor-containing carrier gas resulting from such contacting then is flowed from the receptacle through other passages in the valve block, as also hereinafter more fully described, to outlet 26, which is at a face of the valve block 14 opposite the face provided with inlet 18.

From the outlet, the vapor-containing carrier gas is flowed through connecting conduit 28 and coupling 30 to discharge line 32, for transfer of the vapor-containing carrier gas to a suitable downstream end-use apparatus or process system (not shown).

On the top face 34 of the valve block 14 are disposed laterally spaced-apart flow valves 36 and 38. Valves 36 and 38 are independently operable, being disposed in separate valve ports of the block, as hereinafter more fully described, with the valves being operable to provide selected open or closed valve positions, for normal gas flow operation, and purge gas flow, depending on the respective open or closed valve positions.

Correspondingly, valve 40 is disposed on the front face 42 of the valve block 14. Valve 40 is likewise selectively operable to provide an open or closed valve position, depending on the normal gas flow, or purge gas flow, mode of operation. Valve 40 thus is disposed in a corresponding valve port of the block.

Figure 2:
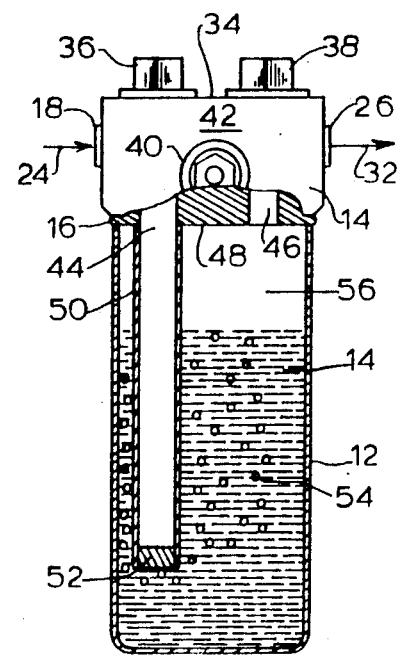
FIG. 2 is a liquid storage/vapor dispensing container of the general type shown in FIG. 1, in which the receptacle and lower portion of the valve block are shown in sectional view to illustrate the operational features thereof.

FIG. 2 is a partially sectioned elevation view of a liquid storage/vapor dispensing container of the general type shown in FIG. 1, but having the coupling means associated with the inlet and outlet, 18 and 26, respectively, omitted for clarity. All other corresponding elements shown in FIG. 1 are correspondingly numbered in FIG. 2.

In this embodiment, the receptacle 12 contains a volume of liquid 14, e.g., an organometallic compound of liquid form, a vapor phase of which is to be dispensed into the carrier gas, such as for semiconductor manufacturer.

The lower portion of the valve block 14 is broken away to show the interior passages at such lower portion, comprising a second gas flow passage 44, and fifth gas flow passage 46, the terms "second" and "fifth" referring to the numbering of respective gas flow passages in the block, as described hereafter.

During the normal gas flow operation of the container shown in FIG. 2, carrier feed gas is introduced from feed line 24 into the valve block 14 and through flow passages and ports hereafter described, flowing then to the second gas flow passage 44 which extends to, and terminates at, the bottom face 48 of the block. Joined to the second gas flow passage 44 at the lower face 48 of the block is a dip tube 50, which extends downwardly from the bottom face of the block into the lower portion of the receptacle 12.

At the lower end of the dip tube there is provided a flow restriction device 52, which may suitably be constructed of sintered metal, superposed layers of screen, ceramic media, or the like. The preferred form of the flow restriction device is a sintered metal plug, e.g., formed of stainless steel, provided at the opening at the lower end of the dip tube. The purpose of such flow restriction device is to effect the generation of finely divided bubbles from the gas passed from second gas flow passage 44 into dip tube 50, whereby a high extent of mass transfer surface is generated per unit volume of gas introduced into the liquid 14.

The dispersion of the carrier gas into the liquid 14 in the form of bubbles 54 permits the carrier gas to efficiently receive vapor from the liquid, which then is augmented by vapor from the overhead gas space 56 in the receptacle, as the carrier gas passes through the receptacle into fifth gas flow passage 46 for discharge from the container, in outlet 26 and discharge line 32.

The inlet of the fifth gas flow passage 46 at the bottom face 48 of the valve block may likewise be provided with a suitable flow restriction device similar in character to device 52, to restrict entrainment of liquid in the vapor-containing carrier gas entering the fifth gas flow passage.

Figure 3:
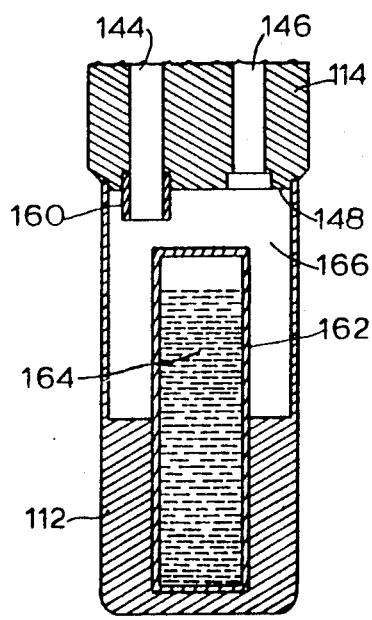
FIG. 3 is a sectional elevation view of a lower portion of liquid storage/vapor dispensing container according to another embodiment of the invention, also of the general type shown in FIG. 1.

FIG. 3 shows a liquid storage/vapor dispensing container according to another embodiment of the invention. All system elements in FIG. 3 are numbered correspondingly with respect to the same elements in FIGS. 1 and 2, by addition of 100 to the reference numerals for the corresponding FIGS. 1–2 elements.

The container shown in FIG. 3 differs from that of FIG. 2, in the provision of a shortened dip tube 160 joined to the second gas flow passage 144 in the valve block 114. The function of this dip tube is to channel the influent carrier gas into the receptacle and thereby prevent short-circuiting or bypassing behavior, i.e., passage of carrier gas from the opening of passage 144 directly to the opening of fifth gas flow passage 146.

Disposed in the interior of receptacle 12 is a liquid enclosure 162 formed of a semipermeable material, which is vapor permeable and liquid retentive in character. The semipermeable material may be any suitable material meeting the criteria of permitting vapor from the liquid 164 to diffuse outwardly from the enclosure through the permeable walls thereof, while retaining liquid in the enclosure. Illustrative materials of construction for the liquid enclosure may include porous ceramics, sintered materials, polymeric materials such as Teflon ® fluorocarbon polymer, and other suitable natural and synthetic membrane materials.

In this embodiment, influent carrier gas from second gas flow passage 144 is channeled through the dip tube 160 and into contact with the receptacle, and the vapor in the gas space 166 surrounding the upper end of enclosure 162. The influent carrier gas in this embodiment thus is not directly contacted with the liquid, since the liquid is retained in enclosure 162.

By virtue of the vapor-permeable, liquid-retentive enclosure in the receptacle, the embodiment of FIG. 3 is unaffected by being tipped over or positioned sideways, with respect to the upright position of the container shown in the FIG. 2 embodiment. Accordingly, there is high resistance to liquid leakage and/or entrainment, and the device may be shipped, stored, or otherwise positioned in the use system, without regard to the orientation or attitude of the device, whereas the device shown in FIG. 2 must be stored, transported, and positioned in the end-use apparatus in an upright position as shown, to avoid leakage of liquid into the gas flow passages of the device, an/or the occurance of liquid entrainment in the use of the container.

Figure 4:
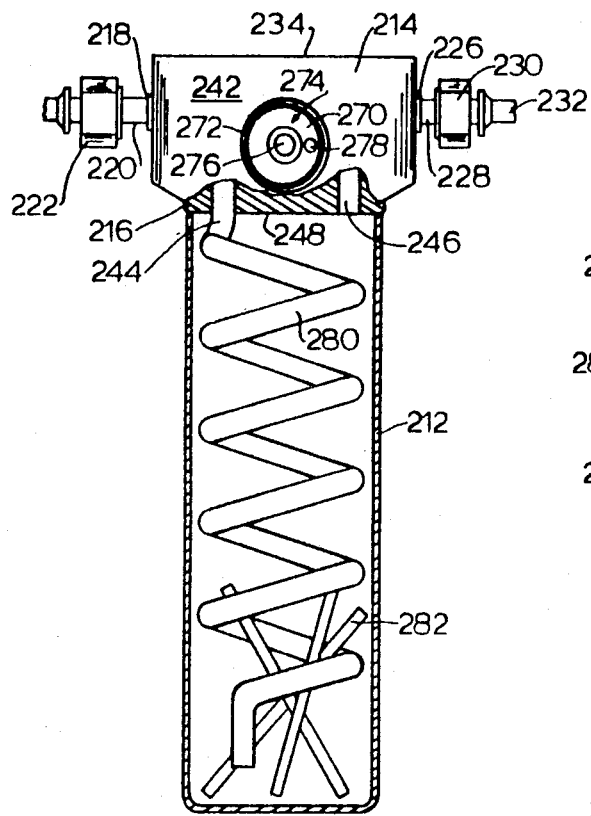
FIG. 4 is a still further embodiment of a liquid storage/vapor dispensing container of the general type shown in FIG. 1, and having the lower portion of the valve block and the receptacle shown in sectional view, to illustrate the elements and operational features thereof.

FIG. 4 shows another embodiment of the invention, in which system elements are numbered correspondingly to FIG. 1, by addition of 200 to the reference numerals for the corresponding FIG. 1 elements. In this embodiment, however, the valves on the top surface 234 of the valve block 214 have been omitted, as has the purge valve mounted at the front face 242 of the valve block. The omission of the purge valve, for reasons of clarity, shows the details of the associated purge port 270, hereinafter referred to as the third valve port. The two valve ports on the top face 234 of the valve block, omitted in FIG. 4 for clarity, are denoted the first and second valve ports, respectively, and are more fully described hereinafter.

The valve port 270 is generally of cylindrical shape with a circular cross-section, and is formed as a bore in the valve block 214. The side wall surfaces 272 of such bore may have a "stepped-down" configuration, or may be threaded or otherwise provided with a structure accomodating the insertion of a suitable valve, such as first valve 36, second valve 38, and third valve 40 shown in FIG. 1.

The cylindrical bore forming the port terminates at its lower end in a generally planar floor 274 of the port. At such floor, the port joins gas flow passage 276, hereinafter referred to as the fourth gas flow passage, and gas flow passage 278, hereinafter referred to as the third gas flow passage. The valve block has an inlet 218 joined to connecting tube 220, and coupling means 222. In like manner, the outlet 226 of the valve block is joined to connecting conduit 228 and coupling means 230, which are in turn connected to discharge line 232.

The valve block 214 is joined to receptacle 212 by means of the circumferentially extending weld 216.

In the lower portion of the valve block 214, second gas flow passage 244 extends downwardly to the bottom face 248 of the valve block, where it is joined, as by welding, bonding, or other suitable joining means, to coil 280. The coil provides an extended flow path for channeling the influent carrier gas to the lower portion of receptacle 212, where it is discharged and flowed in contact with liquid filled tubes 282. Tubes 282 are constructed of a suitable material such as those illustratively described in connection with enclosure 162 in FIG. 3. They are filled with liquid whose vapor phase is to be dispensed from the container, and are permeable to such vapor. The contained liquid thus may be arsine, phosphene, organometallics, etc., as desired for the selected end-use application. Liquid-filled permeation tubes of such type are commercially available as TraceSource ™ Precision Gas Standards Generators, from Kin-Tek Laboratories, Texas City, Tex. After contacting with the vapor of the contained liquid, the resulting vapor-containing carrier gas is discharged from the receptacle 212 in fifth gas flow passage 246, for ultimate discharge at the outlet in discharge line 232.

Figure 5:
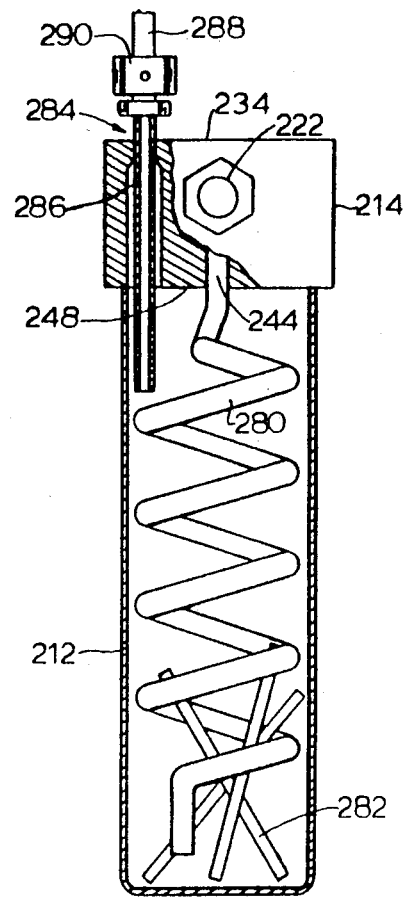
FIG. 5 is a side elevational view in partial section, of a container of the general type shown in FIG. 4, but with the provision of a liquid loading port.

FIG. 5 shows a partially sectioned elevation view of the FIG. 4 liquid storage/vapor dispensing container, which has been modified by the provision of a loading port for introduction of liquid into the receptacle 212. The loading port 284 comprises a loading passage 286 extending through the valve block 214 from the top face 234 to the bottom face 248 thereof. Leak-tightly mounted in the loading passage is a loading tube 288 which extends above the valve block 214, through the loading passage 286 and downwardly below the valve block 214 into the receptacle's upper portion, as shown. The loading tube 288 is suitably provided with a closure means 290 which is manually selectively adjustable to open the loading tube, or close same, to communication with the interior of receptacle 212, as desired.

By means of the loading port, the liquid-filled permeation tubes 282 may be introduced to the receptacle 212 after the receptacle has been welded to the valve block 214. it is also possible to provide the loading port with adequate dimensions and configuration to effect removal of the liquid source tubes 282, after the same have been exhausted following extended operation. In such event, the loading tube 288 may be removed from the loading passage 286 and the container suitably inverted, and shaken or moved as required, to effect removal of the liquid source tubes through the loading passage. For this reason, the loading passage may be provided with a flared interior portion, as shown.

It will be recognized that a similar loading port configuration may be employed in conjunction with containers of the type shown in FIG. 2, whereby liquid is flowed through the loading port into the receptacle, or removed from the receptacle through such port, as desired.

As an illustration of the dimensional characteristics and features of a commercial embodiment of the present invention, of the type generally shown and described with reference to FIGS. 4 and 5, the receptacle may be 2 inches in outer diameter, with a 0.065 inch wide thickness, 6.5 inches in height, and formed of 316L stainless steel. The total height of the container, comprising the receptacle and valve block welded thereto, is on the order of 8 inches. The coiled passage 280 may also be formed of stainless steel, with an outer diameter of approximately 0.25 inch, and a wall thickness of 0.60 inch. The liquid-filled permeation tubes 282 may have an outer diameter on the order of about ⅛ inch, and a length of 2 inches. The valve block 214 in such embodiment has a generally square top face 234 whose side dimensions are approximately 2.75 inches. The valve block may also be formed of stainless steel, and is approximately 1.5 inches in height. The couplings 222, 230 and 290 may suitably comprise VCR® couplings (Crawford Fitting Company, Solon, Ohio).

Figure 6:
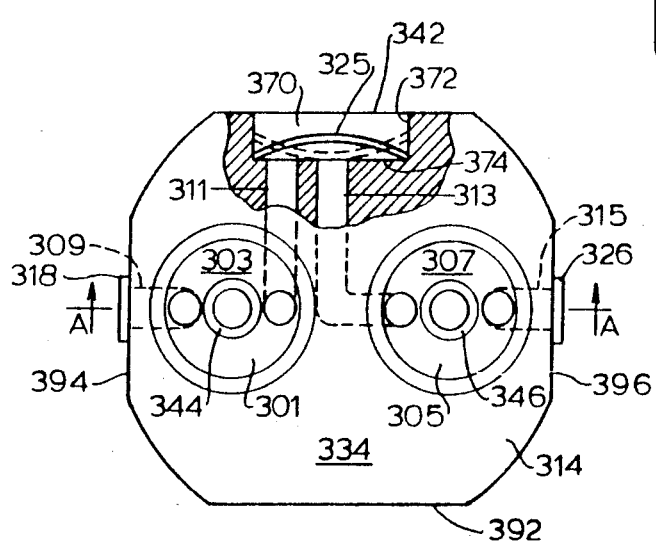
FIG. 6 is a top plan view of a valve block according to one embodiment of the invention, shown in partial break-away view, to illustrate the operation of the large valve port and associated diaphragm valve element.
Figure 7:
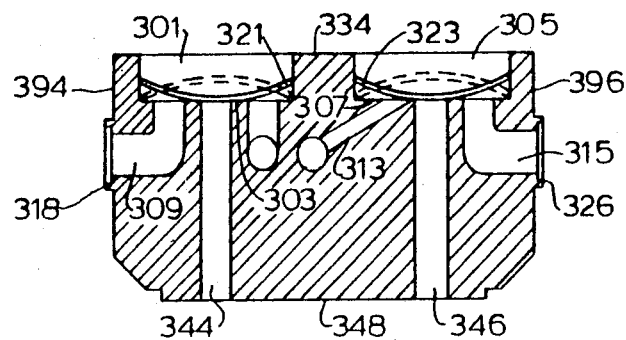
FIG. 7 is sectional elevation view, along line A—A, of the valve block of FIG. 6, in which diaphragm valves are depicted in the first and second valve ports, in fluid communication with the bottom face of the valve block.
Figure 8:
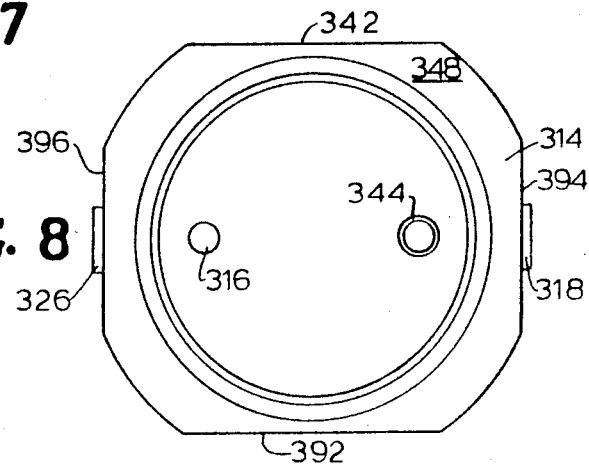
FIG. 8 is a bottom plan view of the valve block of FIGS. 6 and 7, showing the second and fifth gas flow passages at the bottom face of the valve block.

FIGS. 6–8 show respective top plan, sectional elevation, and bottom plan views of a valve block of a type employed in the embodiments of FIGS. 1–5.

All elements in FIGS. 6–8 are numbered correspondingly with respect to the FIG. 4 embodiment, by addition of 100 to the reference numerals for the corresponding FIG. 4 elements.

Referring now to FIG. 6, there is shown a top plan view of valve block 314. The top face 334 of this valve block is planar, as are the main face portions of front face 242, rear face 292, and side faces 294 and 296. Inlet 318 is provided at side face 394, and outlet 326 is provided at side face 396.

A first valve port 301 is provided in the valve block at the top face thereof, as a bore of generally cylindrical configuration extending downwardly into the block and terminating at the planar floor 303 of the port. In spaced relationship to the first port 301 is a second port 305, which is similarly constructed with a generally cylindrical bore configuration terminating at its lower extent in the planar floor 307. The sidewalls of the respective bores forming these ports may be constructed with a stepped-down or threaded configuration, as previously described, whereby the ports accommodate the insertion and coupling of suitable valves.

At the front face 342 of the valve block is a third port 370, also of generally cylindrical configuration, and terminating at its inner extent at planar floor 374. The sidewall 372 of third port 370 may be similarly stepped-down or threaded to accomodate the insertion and coupling of a valve with such port.

The first port 301, at its floor 303, is connected by first gas flow passage 309 with inlet 318. This port likewise is connected at its floor to second gas flow passage 344, extending from the port floor to the bottom face of the valve block, as shown in the bottom plan view of the block in FIG. 8. The first port 301 is also connected at its floor with third gas flow passage 311, joining the first port with the third port 370.

In spaced relation to the third gas flow passage 311, at the floor of third port 370, is fourth gas flow passage 313, joining the third port with the second port 305. The fourth gas flow passage 313 terminates at the floor 307 of the second port 305, in spaced relationship to fifth gas flow passage 346 which extends from such port floor to the lower face 348 of the valve block, as best shown in the bottom plan view of FIG. 8.

In further spaced relationship to the fourth and fifth gas flow passages, is sixth gas flow passage 315, joining the second valve port 305 with outlet 326.

Preferably, as shown, the second and fifth gas flow passages are centrally disposed at their respective junctures with the cylindrical ports 301 and 305.

Such preferred arrangement includes the termini of the respective first and third gas flow passages being disposed in spaced relationship to the terminus of the second gas flow passage at the floor of the first port, with the first and third gas flow passages being joined to the first port at outer portions of the first port floor.

The second port 305 is similarly constructed with the respective fourth and sixth gas flow passages being joined to the port at peripheral portions of the port floor 307, in spaced relationship to the centrally disposed terminus of the fifth gas flow passage 346.

The features of the respective first and second ports and the associated gas flow passages are more fully apparent with reference to FIG. 7, which is a sectional elevational view of the FIG. 6 valve block taken along line A—A, and wherein all reference numbers are the same as in FIGS. 6 and 8.

As shown in FIGS. 1 and 2, each of the first, second, and third valve ports is suitably provided with a valve, each of which is independently operable to provide selected open or closed valve positions. For ease of description in FIGS. 6 and 7, diaphragm valve elements 321, 323, and 325 have been shown as disposed in the first, second, and third valve ports, respectively, with the associated valve body, stem, and associated structure deleted for clarity.

As shown in FIGS. 6–7, each of the respective valve diaphragm elements 321, 323 and 325 are adjustable between open and closed positions. The closed position is shown in FIG. 7 for diaphragm elements 321 and 323 in first and second valve ports 301 and 305, respectively, with the corresponding open positions for these diaphragm elements being shown in dotted line representation.

Correspondingly, the diaphragm element 325 in third valve port 370 is shown in open position, with the corresponding closed position shown in dotted line representation.

By means of conventional associated structure, the diaphragm valve elements may be readily manually adjusted, or automatically adjusted if desired, to assume the open or closed positions described above.

Although diaphragm valves are preferred for simplicity and ease of operation, it is contemplated that any other suitable valve types may be employed in the broad practice of the present invention, as appropriate or desirable to effect the requisite gas flows through the respective gas flow passages and ports in the valve block, as hereinafter described.

When the container of the invention is appropriately coupled at its inlet with a source of suitable carrier gas, and at its outlet with a suitable discharge conduit or other flow means for conveying the vapor-containing carrier gas to the desired use environment, with associated valves disposed in the various valve ports, it will be apparent that there will be "dead space" hold-up gas in the respective valve ports and gas flow passages of the valve block.

By opening the purge valve at third valve port 370, so that, when a diaphragm valve is employed, its diaphragm element has the position shown in FIG. 6, while at the same time closing the valves associated with the first and second valve ports, so that, when diaphragm valves are employed, the diaphragm elements assume the positions shown in solid line representation in FIG.

7, the flow of feed gas takes place to purge the respective gas flow passages and valve ports.

Specifically, with the valves in the previously described positions, feed gas entering the valve block in inlet 318 flows in the serial flow network (hereinafter termed the "purge loop"), comprising inlet 318, first gas flow passage 309, valve port 301 (in the peripheral volume defined between the closed diaphragm element 321, floor 303, and port sidewall portions associated therewith, third gas flow passage 311, third valve port 370, fourth gas flow passage 313, second valve port 305, sixth gas flow passage 315 and outlet 326. The purge loop thus is closed to gas flow communication with the receptacle, by closure of diaphragm valve elements 321 and 323 against the second gas flow passage 344 and fifth gas flow passage 346, respectively.

After purging has taken place to remove the dead spaced hold-up gas from the gas flow passages and ports of the valve block, as necessary to avoid subsequent contamination of the process gas stream, i.e., the vapor-containing carrier gas discharged from the container in subsequent onstream dispensing operation, the active dispensing operation then is commenced as described below.

First, the purge loop is deactivated by closure of the purge valve at the third valve port, so that, when a diaphragm valve element is employed as shown in FIG. 6, such element assumes the position shown in dotted line representation in this drawing. By closure of the purge valve, the associated valve element blocks fourth gas flow passage 313 against flow through the purge port from the third gas flow passage 311, as occurs in the puging operation.

With the purge loop thus closed to flow, the valves associated with the first valve port 301 and second valve port 305 are opened, so that when diaphragm valves are employed at such ports, utilizing the diaphragm valve elements shown in FIG. 7, such elements assume the position shown in dotted line representation in that drawing.

By such action, there is created a second serial flow network ("normal flow loop"), comprising inlet 318, first gas flow passage 309, port 301, second gas flow passage 344, the receptacle (not shown in FIG. 7 for clarity) wherein the carrier gas is contacted with liquid to yield a vapor-containing carrier gas, fifth gas flow passage 346, second port 305, sixth gas flow passage 315, and outlet 326.

For the previously described commercial embodiment of FIG. 4, comprising a container of 8 inch height, and a receptacle of 6.5 inches height and 2 inches outer diameter, a valve block as shown in FIGS. 6–8 may be employed, having a height of approximately 1.5 inches, and a side dimension of approximately 2.75 inches, the planar face portion of which has a length of 1.66 inches. The corners of the block in plan view are rounded off, as shown in FIGS. 6 and 8. In this valve block, the diagonal distance between opposite rounded corners of the valve block on each top and bottom faces, is 3.0 inches. The first, second, and third valve ports in the valve block are, as indicated, of cylindrical configuration, as formed by counter-boring the valve block in each instance to a depth of 0.29 inches, the diameter of each such cylindrical bore being 1.03 inch. The valves which are disposed in the respective valve ports of the block in this commercial embodiment are modified SPD ™ diaphragm valves (Carten Systems, Inc., Middlebury, Conn.).

In some instances, it may desirable to coat the interior surfaces of the gas flow passages in the valve block, and optionally the valve port surfaces, with a protective coating, such as an inert and/or low friction coefficient material. Although any suitable material may be used for such purpose, preferred materials include fluorocarbon polymers, such as polytetrafluoroethylene. In applications where the contained liquid and/or carrier gas is corrosive in character, the receptacle and valve block of the container preferably are formed of a corrsion-resistant material, such as stainless steel.

The carrier gases with which the container of the present invention may be employed include any suitable gaseous material which is able to obtain sufficient vapor in its contacting with the liquid, e.g., by passage through the receptacle, to provide utility in the end-use for which the vapor-containing gas is intended.

For applications such as semiconductor manufacturing, it is generally necessary that the carrier gas be of high purity and inert in the end-use environment, so that no impurities or extraneous constituents are incorporated in the semiconductor device being produced. For such semiconductor manufacturing applications, the carrier gas may be a gas such as nitrogen, helium, hydrogen, argon, and the like, with helium being a preferred inert carrier gas.

The container of the invention may suitably be prepared as a discrete packaged article of commerce, in which the respective inlet and outlet, and the puge valve ports are closed with suitable closure means. The valve ports may be equipped with installed valves or other closure members, e.g., externally threaded pipe caps, and liquid may be packaged in the receptacle.

Such closed container, having liquid therein, may be readily stored and/or transported, and subsequently introduced into a use system wherein valves are appropriately installed, if not already present, and appropriate couplings are effected with the inlet and outlet, to join the device with a suitable flow circuit for purging and subsequent vapor dispensing operation.

The installed device may then be purged in the manner previously described, to rid the system of hold-up dead space gas in the inlet and outlet, and the respective valve ports and gas flow passages.

In applications such as semiconductor manufacture, wherein the liquid contained in the previously described illustrative commercial embodiment may be a polyalkyl source reagent such as trimethyl gallium, the flow passages may be appropriately sized to accomodate a flow rate of carrier gas through the system on the order of from about 20 milliliters per minute to about 4 liters per minute. Such flow rates typically provide a concentration of vapor in the carrier gas, at the outlet of the container, of from about 1 to about 20 millibars partial pressure, at a line pressure on the order of from about 10 to 20 psi. The foregoing range of flow rates is representative of normal operation, it being appreciated that higher flow rates may be necessary or desirable in the purging step prior to commencement of normal vapor-dispensing operation.

While the utility of the liquid storage/vapor dispensing container embodiment of the invention has been primarily described in terms of dispensing of vapor derived from reagent source liquids for semiconductor manufacture operations, it will be apparent that the utility of the invention is not so limited, and that such utility extends to any other applications in which a carrier gas is passed in contact with a liquid as broadly defined herein, to provide a vapor of the liquid in the contacted carrier gas.

The container of the invention may also be employed for any other of numerous operations involving vapor dispensing, such as where a carrier fluid introduced into the receptacle is at elevated temperature and contacts a solid material in the container, to effect sublimation or vaporization thereof, to generate the vapor phase which then is dispensed in the carrier fluid.

In another embodiment, the receptacle of a container according to the present invention may be filled with a solid bed of scavenger material, which is sorptively selective for one or more components of a multicomponent gas mixture. Flow of the gas mixture through the valve block and receptacle will then result in sorption of the selected component(s), to yield a selected component(s)-depleted gas, which is then discharged from the receptacle through the valve block to the outlet of the container.

Figure 9:
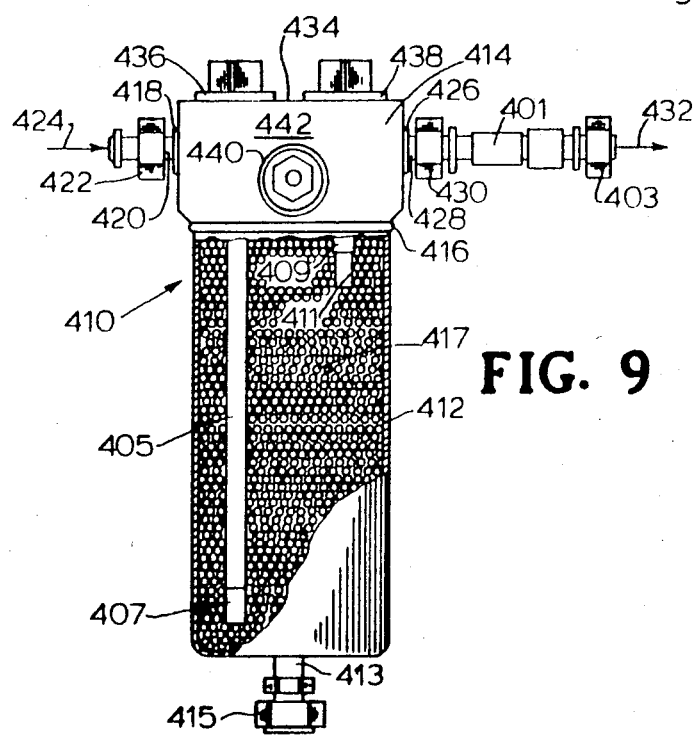
FIG. 9 is an elevation view of a gas purifier container according to one embodiment of the invention, shown in partial sectional view at its receptacle portion.

Such a gas purification vessel is shown in FIG. 9, wherein the apparatus elements are numbered correspondingly to FIG. 1, by addition of 400 to the reference numerals of the corresponding FIG. 1 elements.

As shown in FIG. 9, container 410 comprises valve block 414 leak-tightly joined to receptacle 412 by circumferentially extending weld 416. Disposed in the receptacle in a bed 417 of a suitable sorbent material which is selective for undesired component(s) of the gas to be purified by passage through the container.

The bed or sorbent material may comprise granules, pellets, or particles of a solid active sorbent, or an active sorbent supported on a suitable matrix medium. The sorbent may also be in the form of a gel, semisolid, or in any other suitable form, and may effect removal of impurities from the treated gas by any suitable mechanism, such as physical adsorption, absorption, chemisorption, chelation, etc. Generally, particulate solid or particular matrix-supported chemisorbants are preferred as the sorbent material, preferably those yielding non-volatile or otherwise non-deleterious chemisorption reaction products.

The valve block 414 of container 410 features an inlet 418, to which has been joined a connector conduit 420 and coupling 422, for joining the inlet in gas flow communication with a suitable source of impurity-containing feed gas, such as impurity-containing arsine, phosphine, ammonia, hydrogen bromide, hydrogen chloride, etc., as supplied from the schematically illustrated feed gas line 424, which is joined to a suitable source of feed gas (not shown).

From the feed line, coupling conduit, and inlet, the impurity-containing feed gas is flowed through passages in the valve block 414, as previously described with reference to FIGS. 6-8 herein, and passed into the receptacle 412 for contacting with the sorbent material therein. The impurity-depleted gas resulting from such contacting then is flowed from the receptacle through other passages in the valve block, as also previously described with reference to FIGS. 6-8 herein, to the outlet 426 at the face of the valve block 414 opposite the face provided with inlet 418.

From the outlet, the purified gas is flowed through connecting conduit 428, coupling 430, filter 401, and coupling 403 to dicharge line 432, for transfer of the purified gas to a suitable downstream end-use apparatus or process system (not shown).

The valve block 414 is constructed correspondingly to previously-described embodiments and features laterally spaced-apart flow valves 436 and 348 on the top face 434 of the block. Valves 436 and 438 are independently operable, being disposed in separate valve ports of the block, to provide selected open or closed valve positions, to accomodate normal gas flow operation, and purge gas flow, depending on the respective open or closed valve positions.

Valve 440, disposed in a valve port at the front face 442 of the valve block, is likewise selectively operable to provide an open or closed valve position, depending on the normal gas flow, or purge gas flow, mode of operation.

The receptacle 412 in this gas purification container embodiment is partially broken away to show the dip tube 405 extending downwardly from the second gas flow passage in the valve block into a lower portion of the sorbent bed 417, the dip tube being joined to the second gas flow passage by welding or other suitable joining means at the bottom face of the valve block. At its lower end, the dip tube is joined to a sintered metal filter 407, the purpose of which is to contain the bed, and to prevent fines from being carried in the purified product gas ultimately discharged from the container.

Joined to the fifth gas flow passage of the valve block at its bottom face is a short spacer tube 409, to the lower end of which in turn is joined a sintered metal filter 411. This filter serves to contain the sorbent bed and restricts entrainment of particulate solids in the impurity-depleted product gas flowed through spacer tube 409 to the fifth gas flow passage of the block, for ultimate discharge from the container system in effluent line 432.

At the low end of receptacle 412 is provided a sorbent passage 413 and fill port 415, for introducing fresh sorbent material into the receptacle and removing spent sorbent material therefrom, whereby the gas purification container may be reused after an initial charge of sorbent material has become exhausted after an extended period of operation.

In gas purification operation, the FIG. 9 container may be arranged so that the feed gas line 424 is selectively switchable to a source of purge gas, e.g., argon, helium, nitrogen, hydrogen, etc., or alternatively to a source of the impurity-containing gas to be purified. All valves, including normal flow valves 436 and 438, and purge valve 440, are initially closed.

The container inlet then is coupled to the purge gas supply means. The purge valve 440 is opened, to flow purge gas from the purge gas supply means through the first fluid flow passage, first valve port, third fluid flow passage, third valve port, fourth fluid flow passage, second valve port, sixth fluid flow passage, and outlet, of the valve block, with discharging of purge gas from the outlet 426 and final discharge from the system in line 432.

The purge valve then is closed, and the inlet of the container is uncoupled (switched) from the purge gas supply means, followed by coupling the inlet of the container to a source of the impurity-containing gas, as introduced in feed line 424.

Next the first and second valve port valves, valves 436 and 438, are opened, to flow the impurity-containing gas from the supply means through the inlet, first fluid flow passage, first valve port, second fluid flow passage, the receptacle, the fifth fluid flow passage, second valve port, sixth fluid flow passage, and outlet of the container, for flow of impurity-depleted gas from the outlet 426 to discharge line 432.

The sorbent material utilized in the receptacle of the gas purification container embodiment of the invention may be varied widely depending on the composition of the gas which it is desired to purify. For the purification of gases such as arsine, phosphine, ammonia, and inert gases, to remove Lewis acid and oxidant impurities therefrom, suitable sorbent materials may include the scavengers disclosed in our copending U.S. application Ser. No. 029,632, filed Mar. 24, 1987, hereby incorporated by reference herein. As another example, for drying of hydrogen halide gases to remove water impurity therefrom, the water scavengers disclosed in our copending U.S. application Ser. No. 029,631, filed Mar. 24, 1987, and hereby incorporated by reference herein, may be advantageously employed. Other scavenger materials for the removal of Lewis acid and oxidant impurities from inert fluids are disclosed in U.S. Pat. No. 4,603,148 to G. N. Tom, as potentially useful in the broad practice of the present invention.

Referring again to FIG. 9 as previously described, a commercial gas purification container embodiment of the invention may utilize a valve block 414 having the dimensional characteristics and construction previously described in the illustrative commercial embodiment of the liquid storage/vapor dispensing embodiment of the invention. For such valve block, the receptacle 412 of the purification container may have an outer diameter of approximately 2 inches and a length which may range from about 6 to about 24 inches, depending on the type of scavenger and the capacity required. The receptacle may be formed of a stainless steel, with a wall thickness of 0.065 inch. With such dimensions, the sorbent material capacity of the receptacle may range from on the order of 300 milliliters up to about 1 liter, and typically the receptacle will be substantially completely filled with the sorbent material.

In this illustrative gas purification container embodiment, the couplings 422, 430 and 403 may be 0.25 inch male VCR ® blank fittings. The fill port 415 may correspondingly be a 0.5 inch VCR ® fitting. The filter 401 is suitably a Millipore Wafergard ® 0.05 micron filter (Millipore Corporation). The sintered metal filters 407 and 411 may each be formed of stainless steel with a length of 1 inch and diameter of 0.25 inch, with an average pore size in the range of from about 15 to about 40 microns. These filters serve a bed containment function, and prevent particulates from being passed through the container to the produce gas stream as discharged in line 432, in conjunction with the fines filter 401.

Dip tube 405 in this illustrated embodiment may have an outer diameter of 0.25 inch, with a wall thickness of 0.065 inch, its length being such that, together with the associated filter 407, the lower end of such filter is approximately ⅛ inch above the floor of the receptacle 412. The spacer tube 409 may have similar outer diameter and wall thickness dimensions, and a length on the order of about ⅜ inch. The fill tube 413 may have an inner diameter of 0.41 inch, an outer diameter of 0.6 inch, and a length on the order of 1 inch.

The gas purification container as described above preferably is filled with sorbent material under an inert gas atmosphere, after the receptacle has first been purged with inert gas. After the receptacle has been fully filled with sorbent material, the container is sealed by closure of the fill port 415.

As an example of the use of the illustratively described purification container embodiment of the invention, a container of such type, containing in its receptacle a preconditioned arsine scavenger of the type disclosed in our aforementioned copending U.S. application Ser. No. 029,632, as a sorbent bed of 0.3 liter volume, is able to readily reduce water and oxygen impurities in arsine from levels on the order of 40 parts per million by volume to less than 10 parts per billion by volume. One liter of such scavenger may have an oxygen removal capacity of 1 liter and a gaseous water removal capacity on the order of 2 liters. Thus, a 0.3 liter sorbent bed may be used to treat 15,000 liters of arsine having 20 parts per million by volume water impurity.

Thus, in operation, the normal flow loop and purge flow loop operation of the gas purification container of FIG. 9 is analogous to that previously described in connection with FIGS. 6-8 for the liquid storage/vapor dispensing container embodiment of the invention.

The triple valve configuration of the valve block of the invention permits dead space gases to be readily purged from the system via the integral purge by-pass loop. With the purge (by-pass) valve closed, the valves at the top face of the valve block (e.g., valves 436 and 438 in FIG. 9) provide convenient on-off service for the container in the purification system.

Figure 10:
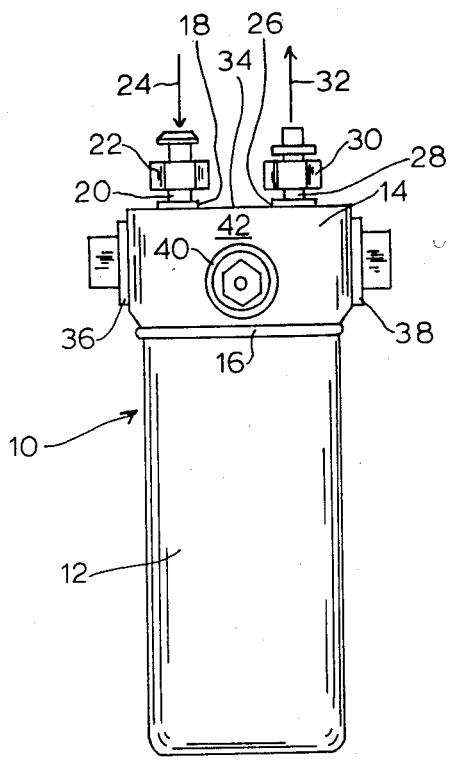
FIG. 10 is an elevation view of a liquid storage/vapor dispensing container, utilizing a valve block according to another embodiment of the invention.

FIG. 10 herein shows an elevation view of a liquid storage/vapor dispensing container according to another embodiment of the invention. All elements and features of the FIG. 10 container are labeled correspondingly with respect to FIG. 1, for ease of indentification. Relative to the embodiment shown in FIG. 1, the FIG. 10 container features the inlet 18 and outlet 28 on the top face of the valve block 14, while the flow valves 36 and 38 are disposed in separate valve ports of the block, as more fully hereinafter described, at side faces of the container. In all other respects, the features previously described in connection with FIG. 1 are applicable to FIG. 10.

Figure 11:
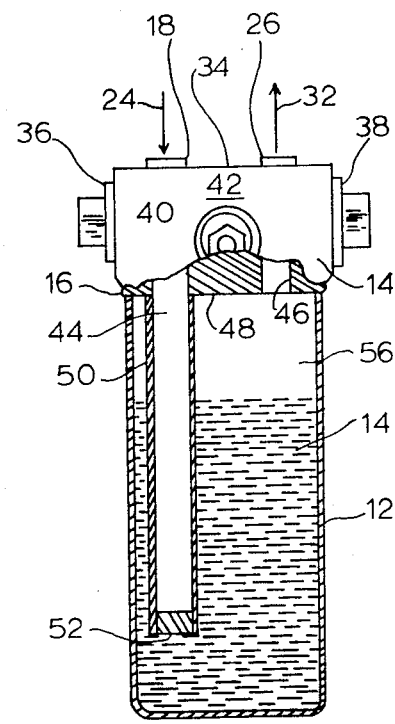
FIG. 11 is a liquid storage/vapor dispensing container of the general type shown in FIG. 10, in which the receptacle and lower portion of the valve block are shown in sectional view to illustrate the operational features thereof.

FIG. 11 is a partially sectional elevation view of a liquid storage/vapor dispensing of the general type shown in FIG. 10, but having the respective coupling means associated with the inlet 18 and outlet 26, omitted for clarity. All other corresponding elements shown in FIG. 11 are numbered correspondingly to FIG. 10, and function as generally described hereinabove with respect to FIG. 2.

Figure 12:
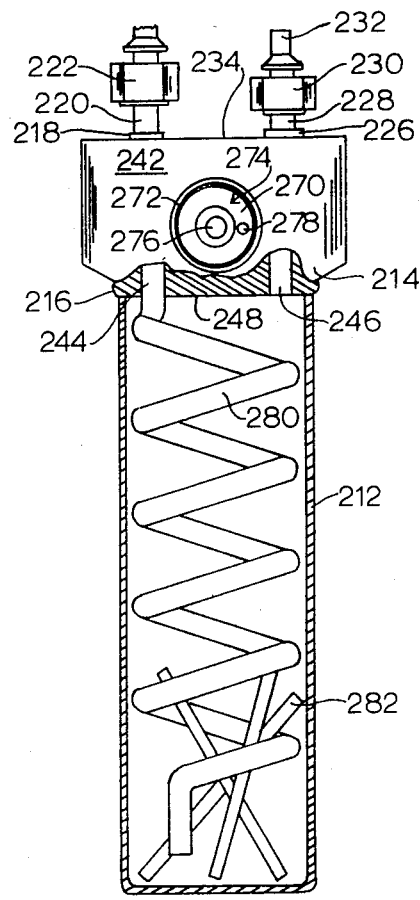
FIG. 12 is another embodiment of a liquid storage/vapor dispensing container of the general type shown in FIG. 10, and having a lower portion of the valve block and he receptacle shown in sectional view, to illustrate the elements and operational features thereof.
Figure 13:
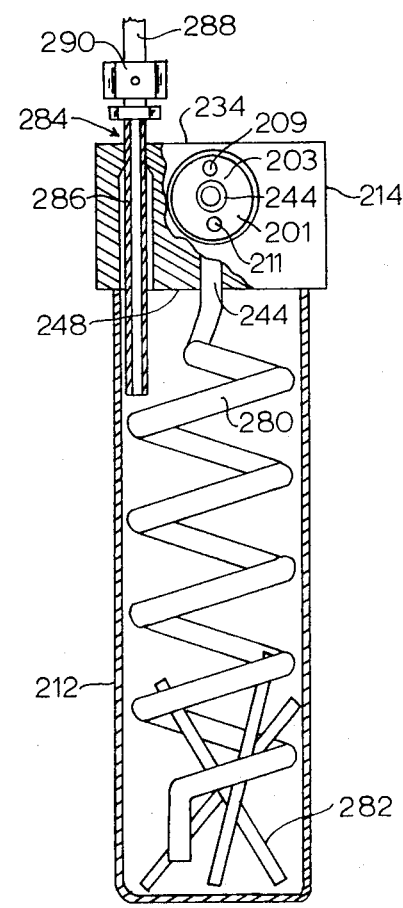
FIG. 13 is side elevational view, in partial section, of a container of the general type shown in FIG. 12, but with the provision of a liquid loading port.

In like manner, FIGS. 12 and 13 correspond to FIG. 4 and 5 with respect to similarly numbered elements, the difference between the respective embodiments of FIGS. 12 and 13 and their counterparts of FIGS. 4 and 5, being that the inlet 218 and associated coupling and outlet 226 and associated coupling are disposed on the top surface of the valve block in FIG. 12, whereas such elements are disposed in respective side surfaces of the block in FIG. 4. Accordingly, the respective side views shown in FIGS. 5 and 13 differ from one another in that FIG. 5 shows coupling means 222 disposed at the side surface of the valve block, while the first valve port 201 is shown at such side surface in FIG. 13. The first valve port 201 is formed by a cylindrically bored cavity in the block having a planar floor surface 203 which is generally parallel to the associated side surface of the block surrounding the valve port. At the floor of the valve port, the port joins a first fluid flow passage 209, which at its opposite end is joined with the inlet of the container, to admit feed gas for purging or normal operation, as desired, depending on the open or closed character of the respective valves disposed at the various valve ports of the block. At the floor of the valve port 201, the port also is joined to second fluid flow passage 244, which in turn is joined to coil 280 depending downwardly into the lower portion of the receptacle 212, as well as being joined to third fluid flow passage 211 connecting the first valve port 201 to the purge valve port 270, as shown in FIG. 12. With respect to all other system elements shown in FIGS. 12 and 13, the same perform as previously described in connection with the correspondingly numbered elements in FIGS. 4 and 5.

Figure 14:
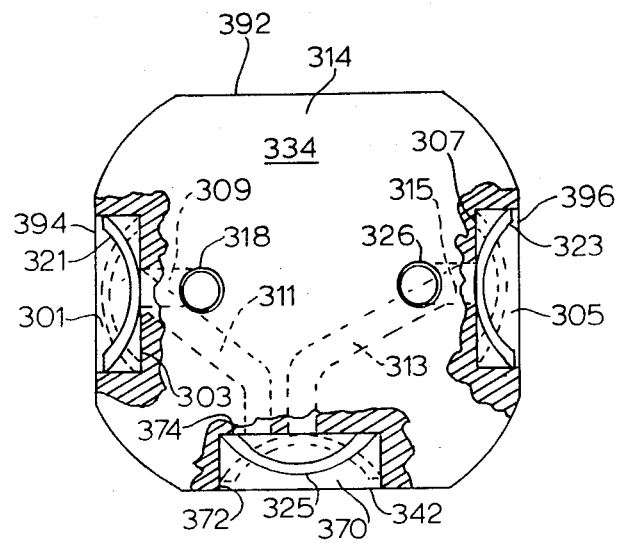
FIG. 14 is a top plan view of a valve block according to a further embodiment of the invention, shown in partial break-away section, illustrating the details of construction of the respective parts associated with the block, and showing diaphragm valve elements associated with the respective ports.
Figure 15:
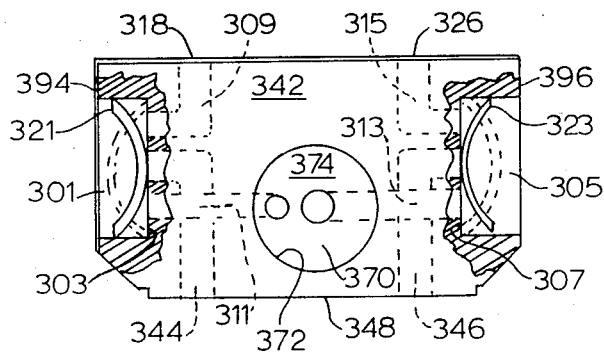
FIG. 15 is a front elevation view of the valve block of FIG. 14, showing diaphragm valve elements in the ports at the respective side faces thereof, and showing the purge valve port on the front face of the block, without any associated valve element.
Figure 16:
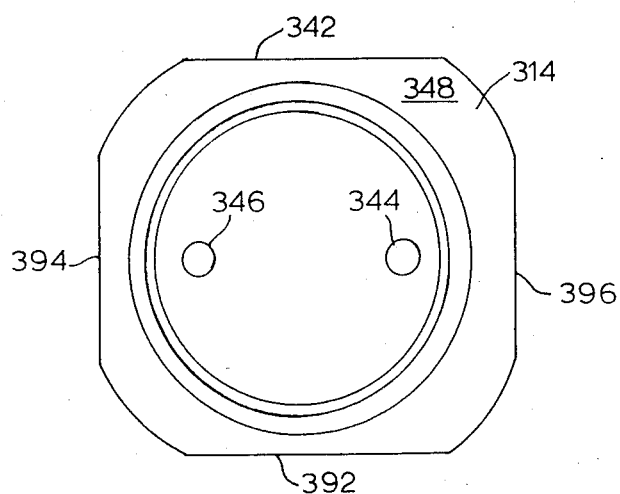
FIG. 16, is a bottom plan view of the valve block of FIGS. 14 and 15.

FIGS. 14–16 shown respective top plan, front elevation, and bottom plan views of a valve block of a type employed in the embodiments of FIGS. 10–13.

All elements in FIGS. 14–16 are numbered correspondingly with respect to the FIGS. 12 and 13 embodiments, by addition of 100 to the reference numerals for the corresponding FIGS. 12-13 elements.

Referring now to FIG. 14, there is shown a top plan view of valve block 314. The top face 334 of this valve block is planar, as are the main face portions of the front face 342, rear face 392, and side faces 394 and 396. Inlet 318 is provided at the top face of the block, in spaced relationship to outlet 326 which is also provided at the top face of the block.

A first valve port 301 is provided in the valve block at a first side face 394 thereof, as a bore of generally cylindrical configuration extending inwardly into the block and terminating at the planar floor 303 of the port. At the opposite face 396 of the block is a second port 305, which is similarly constructed with a generally cylindrical bore configuration terminating at its lower extent in the planar floor 307. The side walls of the respective bores forming these ports may be constructed with a stepped-down or threaded configuration, as previously described, whereby the ports accommodate the insertion and coupling of suitable valves.

At the front face 342 of the valve block is a third port 370, also of generally cylindrical configuration, and terminating at its inner extent at planar floor 374. The side wall 372 of the third port 370 may similarly be stepped-down or threaded to accommodate the insertion and coupling of a valve with such port.

The first port 301 at its floor 303 is connected by first fluid flow passage 309 with inlet 318. This port likewise is connected at its floor to second fluid flow passage 344 extending from the port floor into the block and then downwardly to the bottom face 348 of the valve block, as shown in the bottom plan view of FIG. 16. The first port 301 is also connected at its floor with third fluid flow passage 311, joining the first port with the third port 370.

In spaced relation to the third fluid flow passage 311, at the floor of third port 370, is fourth fluid flow passage 313, joining the third port with the second port 305. The fourth fluid flow passage 313 terminates at the floor 307 of the second port 305, in spaced relationship to fifth fluid flow passage 346. The fifth fluid flow passage 346 extends from port floor 307 inwardly into the interior of the block and then downwardly to the lower face 348 of the block, as shown in FIG. 15.

In further spaced relationship to the fourth fluid flow passage 313 and fifth fluid flow passage 346, is sixth fluid flow passage 315, joining the second valve port 305 with outlet 326.

Preferably, as shown, the second and fifth fluid flow passages are centrally disposed at their respective junctures with the cylindrical ports 301 and 305. Such preferred arrangement includes the termini of the respective first and third fluid flow passages at their junctures with the first port being disposed in spaced relationship to the terminis of the second fluid flow passage at the floor of the first port, with the first and third fluid flow passages being joined to the first port at outer portions of the first port floor.

The second port preferably is similarly constructed with the respective fourth and sixth fluid flow passages being joined to the port at peripheral portions of the port floor 307, in spaced relationship to the centrally disposed terminis of the fifth fluid flow passage 346.

The features of the respective first, second, and third ports and their associated fluid flow passages are otherwise similar to the features of the valve block previously described in connection with FIGS. 4–6 hereof.

In operation, each of the first, second, and third valve ports is suitably provided with a valve, each of which is independently operable to provide selected open or closed valve positions. For ease of description in FIGS. 14 and 15, diaphragm valve elements 321, 323, and 325 have been shown as disposed in the first, second, and third valve ports, respectively, with the associated valve, body, stem, and associated valve structure deleted for clarity. In this respect, it is to be noted that in the front elevation view of FIG. 15, the associated diaphragm valve element 325 has been deleted for clarity, to show the termini of the respective third fluid flow passage 311 and fourth fluid flow passage 313 at the floor 374 of the third valve port 370.

Each of the respective valve diaphragm elements 321, 323, and 325 are adjustable between open and closed positions. The closed position is shown in FIGS. 14 and 15 for diaphragm valve elements 321 and 323, with their corresponding open positions being shown in dotted line representation. Similarly, diaphragm valve element 325 in third port 370 is shown in its open position, with its corresponding closed position being shown in dotted line representation.

By means of conventional associated structure, the diaphragm valve elements may readily manually adjusted, or automatically adjusted if desired, to assume the open or closed positions described above.

As shown in FIG. 14, the third fluid flow passage 311 and fourth fluid flow passage 313 extend angularly forwardly from the respective associated first and third valve port termini toward the third valve port 370, over the majority of their length, and then extend forwardly therefrom toward the floor 374 of third valve port 370 over the remainder of their length.

It will thus be seen by comparison of FIGS. 14–16 with FIGS. 6–8, that the valve block in FIGS. 14–16 features the first and second valve ports at respective side faces of the block, and the third valve port at the front face, with the inlet and outlet respectively disposed at the top surface of the block, whereas in FIGS. 6–8, the inlet and outlet are in respective side faces of the block, and the first and second valve ports are at the top of the block, in spaced relationship to one another.

It will therefore be appreciated that the valve block of FIGS. 14–16 affords "in line" coupling of associated exterior fluid flow lines, manifold connections, and the like, while the valve block of FIGS. 6–8 is intended for coupling with laterally adjacent fittings of fluid flow lines, manifolds, etc. Thus, alternatively configured embodiments of the invention are provided, for convenient coupling into fluid flow circuits of different configurations, when either in line coupling or laterally adjacent coupling may be preferred in specific apparatus systems.

Apart from the alternative positioning of respective inlet, outlet, and first and second valve port elements, and associated configuration of interior fluid flow passages in the valve block, the valve blocks of FIGS. 14–16 and FIGS. 6–8 operate in a same corresponding manner, as previously described in respect of the valve block of FIGS. 6–8.

Figure 17:
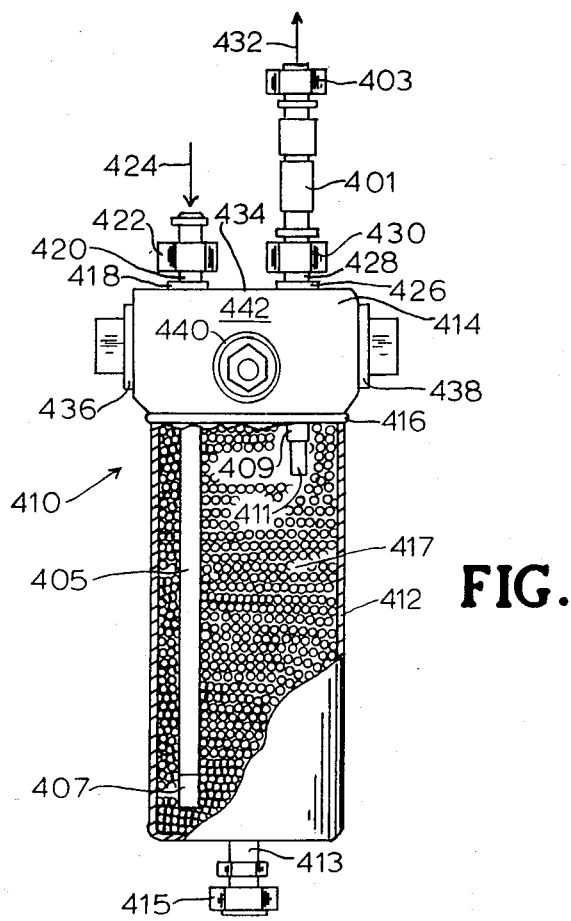
FIG. 17 is an elevation view of a gas purifier container according to another embodiment of the invention, shown in partial sectional view at its receptacle portion.

FIG. 17 shows a container embodiment according to the present invention in which a bed of scavenger material is deployed, for selective sorption of one or more components of a multicomponent gas mixture passed through the receptacle.

The elements of the FIG. 17 apparatus are numbered correspondingly with respect the same or corresponding system elements in FIG. 9. The FIG. 17 gas purifier apparatus is constructed in a manner generally similar to that of FIG. 9, but with the inlet 418 and outlet 428 of the valve block 414 being provided on the top surface 434 of the block, and with the first and second flow valves 436 and 438 being deployed at opposite side surfaces of the block, with the block being configured as shown in FIGS. 14–16 previously described.

With the exception of the positioning of the respective inlet, outlet, first valve port and second valve port, the embodiment of FIG. 17 operates in the same manner previously described in connection with the embodiment of FIG. 9.

Although the invention has been shown with reference to specific detailed embodiments, it will be apparent that numerous modifications, variations, and other embodiments are possible, and accordingly, all such modifications, variations, and embodiments are to be regarded as being within the spirit and scope of the invention.

What is claimed is:

1. A valve block, comprising:
   (a) a block leak-tightly joinable at its bottom face to a receptacle and having top, bottom, front, rear and side faces;
   (b) an inlet in the top face of the block for introducing fluid thereto;
   (c) an outlet in the top face of the block for discharging fluid therefrom, in spaced relationship to said inlet;
   (d) a first valve port in a first side face of the block;
   (e) a second valve port in a second side face of the block;
   (f) a third valve port in the front face of the block;
   (g) a first fluid flow passage joining the inlet and the first valve port;
   (h) a second fluid flow passage joining the first valve port and the bottom face of the block;
   (i) a third fluid flow passage joining the first valve port and the third valve port;
   (j) a fourth fluid flow passage joining the third valve port and the second valve port;
   (k) a fifth fluid flow passage joining the second valve port and the bottom face of the block, and in spaced relationship to the second fluid flow passage;
   (l) a sixth fluid flow passage joining the second valve port and the outlet;
   the respective fluid flow passages at each of said respective valve ports being positioned relative to one another whereby independently operable valves disposed in said valve ports and operable to provide selected open or closed valve positions provide:
   (A) when said third valve port valve is closed and said first and second valve port valves are open, sequential fluid flow from said inlet through only said first fluid flow passage, first valve port, second fluid flow passage, said receptacle, sixth fluid flow passage, and said outlet; and
   (B) when said third valve port valve is open and said first and second valve port valves are closed, sequential fluid flow from said inlet through only said first fluid flow passage, first valve port, third fluid flow passage, third valve port, fourth fluid flow passage, second valve port, sixth fluid flow passage, and said outlet.

2. A valve block according to claim 1, comprising diaphragm valves disposed at each of the said valve ports.

3. A valve block according to claim 1, wherein each said valve port comprises a cylindrical bore in the block, the faces of the block being planar at least in the vicinity of each said bore, and with each said bore having a planar floor within the block which is parallel to its associated planar face portion proximal to the bore.

4. A valve block according to claim 3, wherein the fluid flow passages joined to the respective valve ports are joined thereto at the planar floors of said valve ports.

5. A valve block according to claim 4, wherein said second fluid flow passage joins to a central portion of the floor of said first valve port; said first and third fluid flow passages are joined to a portion of the floor of said first valve port outwardly spaced from said central portion, and from each other; said fifth fluid flow passage joins to a central portion of the floor of said second valve port; and said fourth and sixth fluid flow passages are joined to a portion of the floor of said second valve port outwardly spaced from said central portion thereof, and from each other.

6. A valve block according to claim 3, wherein the floor plane of each said valve port is perpendicular to the central axis of the cylindrical bore of said valve port.

7. A valve block according to claim 1, comprising valves disposed in said valve ports.

8. A container comprising a receptacle leak-tightly joined to a valve block according to claim 1.

9. A container according to claim 8, wherein the inlet has joined thereto coupling means for connection to a fluid supply conduit, and said outlet has joined thereto coupling means for connection to a fluid discharge conduit.

10. A container according to claim 8, wherein the receptacle contains a vapor source liquid.

11. A container according to claim 10, wherein said liquid is an organometallic metal source reagent liquid.

12. A container according to claim 8, wherein the receptacle contains a vapor source liquid in at least one closed, liquid-containing permeable tube of a selected permeability to supply vapor to gas flowed through said receptacle via the valve block.

13. A container according to claim 8, comprising a loading port for introduction of a contacting medium liquid into the receptacle, comprising a loading passage extending through the valve block from the top face to the bottom face thereof, and communicating with said receptacle at said bottom face, and means for leak-tight closure of said passage.

14. A container according to claim 8, comprising joined to said second fluid flow passage at the bottom face of said valve block a conduit extending downwardly into said receptacle to discharge fluid into the receptacle.

15. A container according to claim 14, wherein said conduit has a coiled conformation.

16. A container according to claim 8, wherein the receptacle contains a sorbent material.

17. A container according to claim 16, wherein said sorbent material is sorptively selective for one or more gaseous contaminants selected from the group consisting of Lewis acids and oxidants.

18. A container according to claim 16, including a loading port for introduction of said sorbent material into the receptacle, comprising a loading passage joined to and communicating with said receptacle, and means for leak-tight closure of said passage.

19. A container according to claim 18, wherein the loading passage is joined to the floor of said receptacle.

20. A method of dispensing a vapor phase from a liquid using the container as defined in claim 8, comprising:
 (a) providing said container, containing said liquid, and with valves at each of said first, second, and third valve ports, in closed position;
 (b) coupling the inlet of said container to a carrier gas supply means;
 (c) opening said third valve port valve, to flow carrier gas from said supply means through the first fluid flow passage, first valve port, third fluid flow passage, third valve port, fourth fluid flow passage, second valve port, sixth fluid flow passage, and outlet, and discharging purgate-containing carrier gas from said outlet; and
 (d) closing said third valve port valve and opening said first and second valve port valves, to flow carrier gas from said supply means through the inlet, first fluid flow passage, first valve port, second fluid flow passage, the receptacle, the fifth fluid flow passage, second valve port, sixth fluid flow passage, and outlet, and discharging vapor-containing carrier gas from said outlet.

21. A method of purifying a gas of impurities using the container as defined in claim 8, comprising:
 (a) providing said container, containing a sorbent material sorptively selective for said impurities, and with valves at each of said first, second, and third valve ports, in closed position;
 (b) coupling the inlet of said container to a purge gas supply means;
 (c) opening said third valve port valve, to flow purge gas from said supply means through the first fluid flow passage, first valve port, third fluid flow passage, third valve port, fourth fluid flow passage, second valve port, sixth fluid flow passage, and outlet, and discharging purge gas from said outlet;
 (d) closing said third valve port valve;
 (e) uncoupling the inlet of said container from said purge gas supply means;
 (f) coupling the inlet of said container to a source of the impurity-containing gas; and
 (g) opening said first and second port valves, to flow said impurity-containing gas from said supply means through the inlet, first fluid flow passage, first valve port, second fluid flow passage, the receptacle, the fifth fluid flow passage, second valve port, sixth fluid flow passage, and outlet, and discharging impurity-depleted gas from said outlet.

* * * * *

UNITED STATES PATENT AND TRADEMARK OFFICE
CERTIFICATE OF CORRECTION

PATENT NO.  : 4,738,693
DATED       : April 19, 1988
INVENTOR(S) : Glenn M. Tom

It is certified that error appears in the above-identified patent and that said Letters Patent is hereby corrected as shown below:

Column 6, line 19, change "contanter" to --container--.

Column 6, line 68, change "phase" to --phrase--.

Column 7, line 8, change "copening" to --copending--.

Column 14, line 29, change "puge" to --purge--.

Signed and Sealed this

Twenty-third Day of August, 1988

Attest:

DONALD J. QUIGG

*Attesting Officer*  *Commissioner of Patents and Trademarks*